No. 826,969. PATENTED JULY 24, 1906.
G. STEPHAN.
VARIABLE SPEED AND REVERSING MECHANISM.
APPLICATION FILED MAR. 16, 1906.

Witnesses.
Harry L. Amer,
C. W. Sommers

Inventor.
Georg Stephan,
by Henry Orth Jr.
atty.

UNITED STATES PATENT OFFICE.

GEORG STEPHAN, OF MERTZWILLER, GERMANY.

VARIABLE-SPEED AND REVERSING MECHANISM.

No. 826,969.          Specification of Letters Patent.          Patented July 24, 1906.

Application filed March 16, 1906. Serial No. 306,373.

*To all whom it may concern:*

Be it known that I, GEORG STEPHAN, a subject of the German Emperor, residing at Mertzwiller, Alsace, Germany, have invented certain new and useful Improvements in Variable-Speed and Reversing Mechanism; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to variable-speed and reversing mechanism suitable to be used in connection with machines that require but a small driving power; and it consists of the construction of the coöperating parts hereinafter described and claimed.

Figure 1:
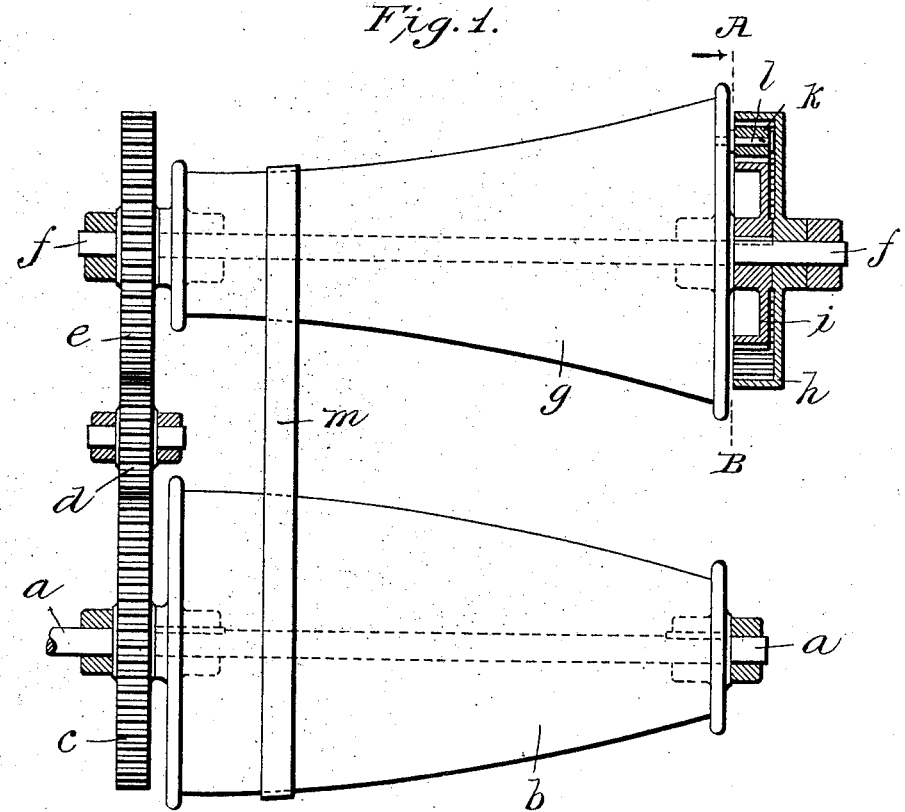
Figure 2:
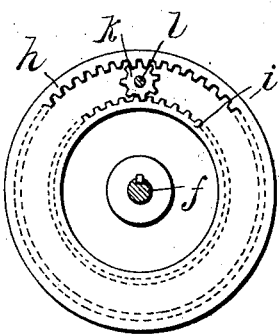

Referring to the drawings, in which like parts are similarly designated, Figure 1 is an elevation, partly in section, of the mechanism. Fig. 2 is a section on line A B of Fig. 1.

In the mechanism, $a$ is the main shaft, from which the power for driving a machine-tool, such as a small lathe or other device, is to be driven, and this shaft may or may not be a line-shaft, depending upon the relative arrangement and location of the machine-tools to the shafting in the shop. Such being the case it will be sufficient to say that the shaft $a$ is driven.

Keyed on shaft $a$ is a cone $b$ and a gear-wheel $c$. The gear-wheel $c$ meshes with an idle gear-wheel or pinion $d$, which in turn meshes with and drives a gear-wheel $e$, said gear-wheel $e$ being shown as of smaller diameter than the gear-wheel $c$, so that the direction of rotation of the gear-wheel $e$ will be the same as the shaft $a$ and gear-wheel $c$, but the speed will be greater.

The gear-wheel $e$ is keyed to shaft $f$ parallel with shaft $a$. On said shaft $f$ is mounted a loose cone $g$, opposite in conicity to cone $b$, and also a loose internally-toothed member $h$, which may be a belt-pulley, as shown, or a gear-wheel at its periphery, this being the member from which power is taken to drive the machine-tool or other device. Fixed on the shaft $f$ and within the internally-toothed member $h$ is a gear-wheel $i$, and between this gear-wheel $i$ and member $h$ and gearing with both of them is a planet-wheel $k$, mounted on stub-shaft $l$, fixed in one end of cone $g$ and here shown as the larger end. The cones are belted together by a belt $m$, capable of being shifted along them by any suitable belt-shifting device. (Not shown.)

The operation is as follows: When the belt $m$ is in such a position that cone $g$ and shaft $f$ have the same speed of rotation—i. e., angular speed—the member $h$ will move in unison therewith. When the speed of the cone $g$ lags behind that of shaft $f$, the direction of rotation of the member $h$ will be reversed, and when the speed of cone $g$ is greater than that of shaft $f$ the member $h$ will be rotated at a greater speed than that of shaft $f$ and in the same direction.

It is of course obvious that the relative diameter of the gear-wheel $c$ to $e$ can be varied to suit the circumstances of use as well as the conicity of the cones, and that in place of a single planet-wheel $k$ several such may be used symmetrically arranged around the center of the cone $g$, thereby giving greater strength and more uniformly distributed power, also that stepped pulleys the equivalents of the cones may be used in their stead.

Having thus described my invention, what I claim as new therein, and desire to secure by Letters Patent, is—

1. In a mechanism such as described, a driving-shaft, a gear-wheel and cone fixed thereon, a driven shaft parallel to the first shaft, a gear-wheel fixed thereto at one end and an idle pinion between the two gear-wheels, a cone loose on the driven shaft of opposite conicity to the one on the driving-shaft, an internally-toothed member loose on the driven shaft, a gear-wheel within the member fixed on the driven shaft, a planet-wheel on the second cone meshing with the internally-toothed member and gear-wheel therein, and a shiftable belt connecting the two cones.

2. In a mechanism such as described, a driving-shaft and a cone fixed thereon, a shaft driven from the driving-shaft, a cone loose thereon, a belt belting the two cones together, a gear-wheel fixed on the driven shaft, a member loose on the driven shaft and planet-wheel coöperating with said member and gear-wheel to impart differential motion to the member.

3. In a mechanism such as described, a driving-shaft, a cone fixed thereon, a shaft driven from the driving-shaft, a cone loose thereon, a shiftable belt driving the loose cone from the fixed cone to vary the speed of the former cone, a member loose on the driven shaft, and differential mechanism coöperating with the cone, driven shaft and member to differentially drive said member.

4. In a mechanism such as described, a driven shaft, a cone loose thereon, an internally-toothed member loose on said shaft, a gear-wheel in said member fixed on the shaft, planet-gear carried by the cone and between the gear-wheel and member, and means to drive the cone at different speeds independent of the speed of the shaft.

5. In a mechanism such as described, a driving-shaft, a gear-wheel and a cone fast thereon, a driven shaft, a gear-wheel fixed thereon differing in diameter from the gear-wheel on the driving-shaft, an idle pinion between the two gear-wheels, a cone and an internally-toothed member both loose on the driven shaft, a gear-wheel fixed on the driven shaft within the internally-toothed member, a planet-wheel mounted at the end of the cone and engaging both the member and gear-wheel therein, and a shiftable belt to drive the loose cone from the fixed cone.

In testimony that I claim the foregoing as my invention I have signed my name in presence of two subscribing witnesses.

GEORG STEPHAN.

Witnesses:
D. JEAN WEIMEL,
JULIUS GRUBER